No. 737,432. Patented August 25, 1903.

UNITED STATES PATENT OFFICE.

JULIUS MEINL, OF VIENNA, AUSTRIA-HUNGARY.

PROCESS OF MANUFACTURING COCOA SUBSTITUTES.

SPECIFICATION forming part of Letters Patent No. 737,432, dated August 25, 1903.

Application filed January 28, 1902. Serial No. 91,652. (No specimens.)

*To all whom it may concern:*

Be it known that I, JULIUS MEINL, manufacturer, a subject of the Emperor of Austria-Hungary, residing at Fleischmarkb 15, Vienna, Austria-Hungary, have invented an Improved Process for the Manufacture of Cocoa Substitutes; and I do hereby declare the following to be a full, clear, and exact description of the invention, such as will enable others skilled in the art to which it appertains to make and use the same.

This invention has for its object the production of a substitute for pure cocoa; and it consists in the process hereinafter set forth for making such a substitute.

One of the principal objects of the invention is that the product of this process shall be a substance which is readily soluble in water or milk. If an attempt is made to manufacture a cocoa substitute by simply mixing cocoa with malt, as produced by ordinary treatment, a product is obtained which is practically useless and unsalable, as these constituents cannot be so intimately mixed as to present a uniform appearance or to be readily dissolved in water with complete uniformity.

My invention is designed to obviate the defects above referred to by effecting the mixing during the crushing or coarse grinding and before the milling or pressing, the operation being as follows: Cocoa which has been either naturally roasted or opened by means of alkalies is submitted to the ordinary crushing and cleaning operation and then mixed with malt obtained from any suitable grain—such as barley, wheat, rye, rice, or maize—the proportions of the mixture depending on the quality of the product required, and this mixture is then milled in a cocoa-mill. The malt is dextrined with or without the assistance of diastase and roasted at a temperature exceeding 75° centigrade before it is mixed with the cocoa. The excellence of the flavor of the resultant product is largely dependent upon the skill with which the roasting of the cocoa-bean and of the malt is carried out, and it must be left to the expert operator to suit the taste of buyers.

Having thus described my invention, what I claim as new, and desire to secure by Letters Patent of the United States, is—

The process of manufacturing cocoa substitutes, which consists in roasting cocoa-beans, crushing and cleaning them, dextrining malt and roasting it at a temperature exceeding 75° centigrade, mixing said malt with said cocoa-beans and grinding such mixture of crushed cocoa-beans and malt in a cocoa-mill, substantially as described.

In testimony that I claim the foregoing I have hereunto set my hand this 13th day of January, 1902.

JULIUS MEINL.

Witnesses:
C. B. HURST,
ALVESTO S. HOGUE.